US006553473B1

United States Patent
Gaskins et al.

(10) Patent No.: US 6,553,473 B1
(45) Date of Patent: Apr. 22, 2003

(54) BYTE-WISE TRACKING ON WRITE ALLOCATE

(75) Inventors: Darius D. Gaskins, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/539,146

(22) Filed: Mar. 30, 2000

(51) Int. Cl.$^7$ .............................................. G06F 12/00
(52) U.S. Cl. ..................... 711/169; 711/125; 711/126; 711/128; 711/123
(58) Field of Search ................................. 711/118, 169, 711/125, 126, 123, 128

(56) References Cited

U.S. PATENT DOCUMENTS

| 5,454,091 | A | * | 9/1995 | Sites et al. ................. 711/118 |
| 5,488,709 | A | * | 1/1996 | Chan ......................... 711/118 |
| 6,240,485 | B1 | * | 5/2001 | Srinivasan et al. ............ 365/49 |
| 6,513,104 | | * | 1/2003 | Gaskins ...................... 711/169 |

OTHER PUBLICATIONS

Li et al., "Data Cache Parameter Measurements", ® ICCD 1998, p. 376–383.*

* cited by examiner

Primary Examiner—Do Hyun Yoo
Assistant Examiner—Brian R. Peugh
(74) Attorney, Agent, or Firm—Richard K. Huffman; James W. Huffman

(57) ABSTRACT

An apparatus and method within a pipeline microprocessor are provided for allocating a cache line within an internal data cache upon a write miss to the data cache. The that apparatus and method allow data to be written to the allocated cache line before fill data for the allocated cache line is received from external memory over a system bus. The apparatus includes write allocate logic and a write buffer. The write allocate logic allocates the cache line within the data cache, it stores data corresponding to the write miss within the allocated cache line, and queues a speculative write command directing an external bus to store said the data to the external memory in the event that transfer of the fill data is interrupted. The speculative write command is stored in the write buffer and, in the event of an interruption such as a bus snoop to the allocated cache line, the write buffer issues the speculative write command to the system bus, thereby writing the data to external memory. When the fill data is received from the system bus, it is filtered by byte-wise tracking logic such that only bytes positions which have not been written during the interim are updated in the allocated cache line.

29 Claims, 10 Drawing Sheets

Response Buffer Byte-Wise Write Allocation

BYTE-WISE TRACKING ON WRITE ALLOCATE

CROSS-REFERENCE TO RELATED APPLICATIONS

This application is related to U.S. patent application Ser. No. 09/538,608, now U.S. Pat. No. 6,513,104, entitled Byte-Wise Write Allocate With Retry Tracking, having common inventors, and filed on the same day as this application.

BACKGROUND OF THE INVENTION

1. Field of the Invention

This invention relates in general to the field of instruction execution in computers, and more particularly to an apparatus and method for allocating lines within a data cache upon writes to memory.

2. Description of the Related Art

The architecture of a present day pipeline microprocessor consists of a path, or channel, or pipeline, that is divided into stages. Each of the pipeline stages performs specific tasks related to the accomplishment of an overall operation that is directed by a programmed instruction. Software application programs are composed of a number of programmed instructions. As an instruction enters the first stage of the pipeline, certain tasks are accomplished. The instruction is then passed to subsequent stages of the pipeline for the execution of subsequent tasks. Following completion of a final task, the instruction completes execution and exits the pipeline. Execution of programmed instructions by a pipeline microprocessor is very much analogous to the manufacture of items on an assembly line.

The efficiency of any assembly line is primarily a function of the following two factors: 1) the degree to which each stage of the assembly line can be occupied with productive work; and 2) the balance of the effort required to perform tasks within each individual stage as compared to that required to perform tasks in the other stages, in other words, the degree to which bottlenecks are avoided in the assembly line. These same factors can also be said to affect the efficiency of a pipeline microprocessor. Consequently, it is incumbent upon microprocessor designers 1) to provide logic within each of the stages that maximizes the probability that none of the stages in the pipeline will sit idle and 2) to distribute the tasks among the architected pipeline stages such that no one stage will be the source of a bottleneck in the pipeline. Bottlenecks, or pipeline stalls, cause delays in the execution of application programs.

A pipeline microprocessor receives its data inputs from and provides its results to the outside world through memory devices that are external to the microprocessor. These external memory devices, along with the microprocessor are interconnected in parallel via a system bus. The system bus interconnects other devices as well within a computing system so that the other devices require can access data in memory or communicate with the microprocessor.

The memory devices used within present day computing systems operate almost an order of magnitude slower than logic devices internal to the microprocessor. Hence, when the microprocessor has to access external memory to read or write data, the program instruction directing the memory access is stalled in the pipeline. And if other devices are accessing data over the system bus at the same time that the microprocessor wants to access memory, then the program instruction may experience more lengthy delays until the system bus becomes available.

For these two reasons, a present day microprocessor incorporates a smaller-yet significantly faster-memory device within the microprocessor itself. This memory device, referred to as a cache, retains a copy of frequently used data so that when the frequently used data is required by instructions within an application program, rather than experiencing the delays associated with accessing the system bus and external memory, the data can be quickly accessed from within the cache.

The management of data within a cache, however, is a very complex task involving algorithms and logic that identify frequently used data and predict when one block of data is to be cast out of the cache and another block of data is to be retrieved into the cache. The goal of an effective data cache is to minimize the number of external memory accesses by the microprocessor. And to minimize the number of accesses to the system bus, present day cache logic does not read data from memory one byte at a time. Rather, memory is read into a cache in multiple-byte bursts. The number of bytes accessed within a burst is called a cache line. Cache lines are typically on the order of tens of bytes. Many pipeline microprocessors today employ 32-byte cache lines. Thus, when the system bus is accessed to retrieve data from external memory, an entire cache line is read that contains the required data along with surrounding data. Reading in the surrounding data is beneficial as well because one of the characteristics of application programs is that they tend to use data that is adjacent to that which has just been accessed. Consequently, when a program instruction requires a data entity that is not within the cache, the cache line that contains the data entity is retrieved from memory and placed into the cache. As a result, if following instructions require access to the data entity or surrounding data entities, they can execute much faster because the cache line is already present in the cache.

But program instructions not only read data from memory; they also write data. And the attribute of application programs discussed above applies just as well to writing data to memory as it does to reading data from memory. More specifically, when a program instruction directs a write to a location in memory, it is also very probable that following program instructions will either want to read or write that location or other locations within the same cache line. Hence, when a program instruction is executed that directs a write to a memory location that is not in the cache, a present day microprocessor first reads the corresponding cache line into the cache and then writes the data to the cache line. This technique for writing data is commonly referred to as blocking write allocate because a cache line entry within a cache is reserved, or allocated, only in response to a read operation. Consequently, every time that a program instruction directs a write to a memory location whose corresponding cache line is not within the cache, a read of the cache line is performed prior to writing the data.

For the program instruction directing the write to external memory, the above scenario is inconsequential because most microprocessors today provide store buffers within which memory write data can be buffered. Thus, the program instruction can continue to proceed through the pipeline without delay. Cache control logic within the microprocessor will complete the write to the allocated cache line within the cache after the cache line has been read.

But there is a problem associated with the blocking write allocate technique when viewed from the standpoint of following instructions. While the data associated with the first write to the cache line is retained within the store buffer, subsequent writes to the same cache line must be stalled only when the complete cache line is retrieved from memory and updated in the data cache can the following write instructions be allowed to proceed. This is a problem. More specifically, application programs that exhibit a significant number of writes to external memory experience considerable delays when they are executed on present day microprocessors employing blocking write allocate techniques.

Therefore, what is needed is an apparatus for allocating a cache line within a data cache corresponding to a memory write that does not require that the cache line first be loaded into the cache from memory.

In addition, what is needed is a pipeline microprocessor that can execute multiple writes to the same cache line much faster than has heretofore been provided.

Furthermore, what is needed is a data cache apparatus in a pipeline microprocessor that allows subsequent writes to a cache line to proceed without delay while waiting for the cache line to be provided from memory.

Moreover, what is needed is a method for improving the processing speed of a pipeline microprocessor executing multiple writes to adjacent memory locations that are not presently within its cache.

SUMMARY OF THE INVENTION

To address the above-detailed deficiencies, it is an object of the present invention to provide a microprocessor that allocates a cache lines on memory writes without first loading the required cache lines from memory.

Accordingly, in the attainment of the aforementioned object, it is a feature of the present invention to provide an apparatus in a pipeline microprocessor for allocating a first cache line within a data cache upon a write to an external memory location that is not presently within the data cache. The apparatus includes write allocate logic and a write buffer. The write allocate logic stores first bytes within the first cache line corresponding to the write, it updates remaining bytes of the first cache line from memory, and queues a speculative write command directing an external bus to store the first bytes to the external memory location. The write buffer is coupled to the write allocate logic. The write buffer buffers the speculative write command and issues the speculative write command to the external bus when update of the remaining bytes is interrupted.

An advantage of the present invention is that subsequent writes to addresses within an allocated cache line are not held up waiting for the corresponding cache line to be retrieved over the system bus.

Another object of the present invention is to provide a data cache apparatus in a pipeline microprocessor for executing multiple writes to the same cache line, where the cache line corresponding to the multiple writes is not initially present within the data cache.

In another aspect, it is a feature of the present invention to provide a cache line allocation apparatus within a pipeline microprocessor, for allocating a selected cache line upon a write miss. The cache line allocation apparatus has a data cache and cache control logic. The data cache stores a plurality of cache lines retrieved from external memory, where the plurality of cache lines are 32 bytes. The cache control logic is coupled to the data cache. The cache control logic stores data corresponding to the write miss within the selected cache line, and updates the selected cache line from the external memory, where selected bytes within the selected cache line are not updated, the selected bytes being those within which the data are stored.

Another advantage of the present invention is that back-to-back writes to locations within a cache line execute must faster that what has heretofore been provided.

A further object of the present invention is to provide a data cache apparatus in a pipeline microprocessor that allows subsequent writes to a cache line to proceed without delay while waiting for the cache line data to be provided from memory.

In a further aspect, it is a feature of the present invention to provide an apparatus for performing write allocation in a data cache when a write miss occurs. The apparatus includes write allocate logic and a write buffer. The write allocate logic updates a cache line within the data cache with data bytes corresponding to the write miss and with data from external memory, wherein the data bytes are updated prior to update of the data from the external memory, and wherein byte positions within the cache line corresponding to the data bytes are masked during update of the data, thereby preserving the data bytes within the cache line. The write allocate logic includes snoop/backoff control logic. The snoop/backoff control logic detects events that interrupt update of the cache line. The write buffer is coupled to the write allocate logic. The write buffer stores a speculative write command, the speculative write command directing that the data bytes be stored within said external memory.

Yet a further object of the present invention is to provide a method for improving the processing speed of a pipeline microprocessor executing multiple writes to adjacent memory locations that are not presently within its cache.

In yet a further aspect, it is a feature of the present invention to provide a method for allocating a cache line within a pipeline microprocessor. The method includes storing data bytes corresponding to a write miss to an allocated cache line within the data cache; queuing a speculative write command to external memory corresponding to the write miss; updating remaining bytes within the allocated cache line from external memory; and if the updating is interrupted, issuing the speculative write command, thereby storing the data bytes to the external memory.

Yet a further advantage of the present invention is that application programs exhibiting a significant number of external memory write operations execute more efficiently within a pipeline microprocessor according to the present invention.

BRIEF DESCRIPTION OF THE DRAWINGS

These and other objects, features, and advantages of the present invention will become better understood with regard to the following description, and accompanying drawings where.

DETAILED DESCRIPTION

In light of the above background on how a pipeline microprocessor allocates cache lines within its data cache upon a write miss, several related art examples will now be discussed with reference to FIGS. 1 through 3. These examples illustrate the problems associated with present day techniques for performing write allocation. More specifically, because present day microprocessors only write data into a cache line that has already been loaded into their data cache, when a write miss occurs, the cache line corresponding to the miss must first be retrieved from external memory prior to performing the write within the cache. This approach is quite cumbersome and sets up conditions that will very likely result in future stalls within the microprocessor pipeline. Following this discussion, a detailed description of the present invention will be provided with reference to FIGS. 4 through 10. The present invention overcomes the limitations attributed to current write allocation techniques by providing an apparatus and method for both allocating and writing data to a cache line within a data cache before the corresponding cache line in external memory is loaded.

Figure 1:
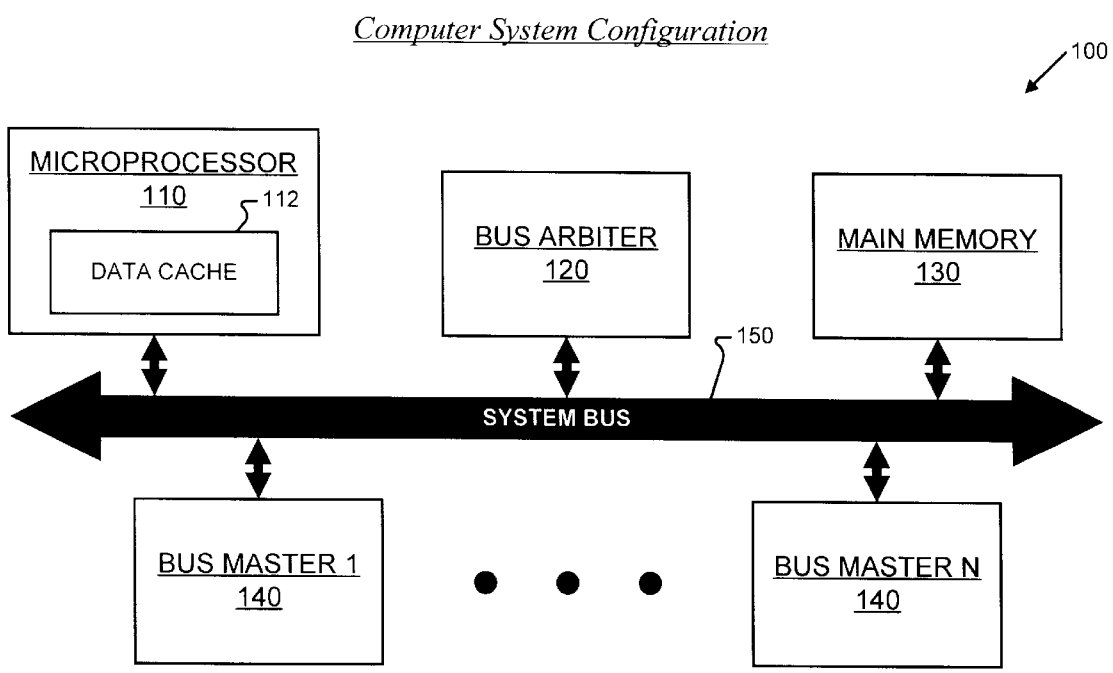
FIG. 1 is a block diagram illustrating a typical related art computer system configuration.

Referring to FIG. 1, a block diagram is presented illustrating a typical related art computer system configuration 100. The computer system configuration 100 includes a microprocessor 110, a bus arbiter 120, a main memory 130, and a number of bus master devices 140. The devices 110–140 within the computer system configuration 100 are interconnected via a system bus 150. In a present day desktop computer 100, one most often finds these devices 110–140 embodied as integrated circuit chips physically attached to a motherboard. The system bus 150 is embodied as conductive traces on the motherboard.

Operationally, the devices 110–140 utilize the system bus 150 to communicate with one another and to access (i.e., load and store) common data. The common data typically is stored within the main memory 130, which most often physically consists of dynamic random access memory (DRAM) devices. When the microprocessor 110 or one of the other bus master devices 140 requires access to data in main memory 130, a bus request is issued to the bus arbiter 120. The function of the bus arbiter 120 is to arbitrate the system bus 150, that is, to provide fair and timely access to the bus 150 for all interconnected devices 110–140 within the computer system 100. The set of rules by which the bus arbiter 120 governs access to the bus 150 and by which the devices 110–140 communicate with one another is called the bus protocol.

In accordance with the bus protocol, the bus arbiter 120 determines which requesting device 110, 140 may access the bus 150 and when that access is to occur. In some systems, one or more bus masters 110, 140 may be allowed to supercede access requests by lower priority devices. In alternative system configurations, all access requests by bus masters 110, 140 are treated with equal priority on a first-come first-served basis. Regardless of the specific bus protocol that is employed for governing access to the bus 150, it is noted that the bus arbiter 120 has the ability to immediately grant bus access to a requesting device 110, 140 or the device 110, 140 may be directed to wait. Furthermore, a device 110, 140 that is currently executing a bus access operation may be directed by the bus arbiter 120 to suspend the access operation for some number of bus cycles, or it may be directed to start the operation over again, or in the extreme, the device 110, 140 could be directed to cancel the access operation entirely. To summarize, if and when a particular requesting device 110, 140 is granted bus access depends entirely upon the particular bus protocol employed in the system 100 and more specifically upon the number of other devices 110, 140 that are concurrently requesting access. Consequently, it is not prudent for a designer to rely upon being able to access main memory 130 within a certain number of bus cycles because access times cannot be easily predicted. Although the bus arbiter 120 is shown in FIG. 1 as a separate device on the bus 150, one skilled in the art will appreciate that the bus arbitration function may as well be physically implemented as logic within the microprocessor 110, or within one of the other bus master devices 140, or the arbitration function may be distributed among all of the master devices 110, 140 on the bus 150.

In addition to unpredictable access times, it is noted that once bus access has been granted to a requesting device 110, 140, the speed at which data is loaded from main memory 130 is quite slow compared to the clock frequency internal to the device 110, 140. For example, within the number of external bus clock cycles that it takes to load data from a given location in the main memory 130, the microprocessor 110 has the capacity to execute a significant number of instructions subsequent to the instruction that initiated the load operation. However, the microprocessor 110 typically will not be allowed to execute those subsequent instructions because it is highly probable that an instruction following the load instruction will also require the data that is being loaded from memory 130. Stalling the execution of subsequent instructions in this manner manifests itself to a user in the form of program delays.

Because access to data within the main memory 130 is slow and unpredictable, microprocessor designers have implemented means whereby a portion of the data within the main memory 130 is copied to and retained within a very fast memory that is internal to the microprocessor 110. This memory structure, called a data cache 112, is much smaller in size than the main memory 130, but it operates at the clock frequency of the microprocessor 110. Caches 112 are ubiquitous within the microprocessor industry. Today, it is not uncommon to find cache sizes on the order of hundreds of thousands of bytes. Yet, a 256 k byte internal data cache 112 is still markedly smaller than an average main memory configuration 130, which is on the order of a 128 MB. And since all of the locations within main memory 130 cannot reside within the data cache 112 at the same time, designers also provide logic within the microprocessor 110 to retain data in the cache 112 that will be most likely be required by an application program. A good cache design within a microprocessor 110 is perhaps the most significant factor that contributes to precluding program delays associated with accessing memory 130 over the bus 150.

A typical system bus 150 allows devices 110, 140 to access several sequential memory locations in parallel within a single bus clock cycle. To exploit this feature, it is not uncommon today to find cache designs 112 that load 32 bytes of data from memory 130 within a burst of four 8-byte reads. The number of bytes accessed within the burst is known as a cache line. Cache line sizes vary from roughly eight bytes to several hundred bytes. The examples herein employ a 32-byte cache line for illustrative purposes only. One skilled in the art will appreciate that a 32-byte cache line is representative of a present day cache 112. Accordingly, when a device 110, 140 is granted access to the bus 150 by the bus arbiter 120, it typically loads a complete cache line from memory 130 in a burst fashion rather than loading one memory location at a time. In addition to the speed improvements gained through burst accesses, reading an entire cache line into the cache 112 is also very beneficial from a program execution standpoint. This is because 1) application programs tend to use data that is stored close to a memory location that has already been accessed, and 2) application programs tend to use the most recently accessed locations again. Consequently, once a load instruction that references a particular memory location has caused a corresponding cache line including the memory location to be loaded from memory 130 into the data cache 112, there is a high probability that following instructions will also reference data within the same cache line was loaded.

Figure 2:
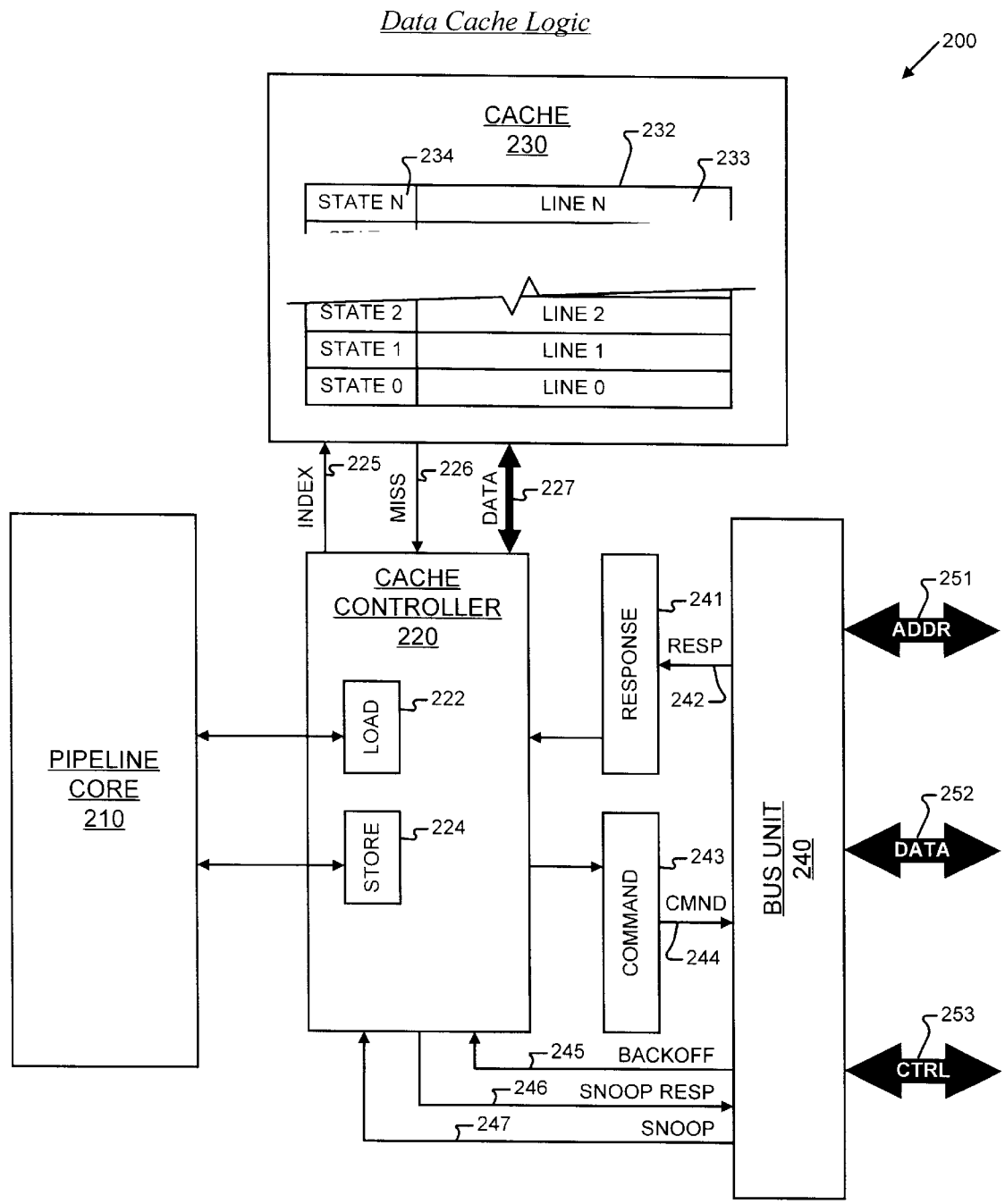
FIG. 2 is a block diagram depicting data cache logic within a related art microprocessor.

Now referring to FIG. 2, a block diagram is provided depicting data cache logic 200 within a related art microprocessor. The data cache logic 200 includes a microprocessor pipeline core 210 that is coupled to a cache controller 220 via a load buffer 222 and a store buffer 224. The cache controller 220 is connected to a data cache 230 via an index bus (INDEX) 225, a miss signal (MISS) 226, and a cache data bus (DATA) 227. The cache 230 includes a cache array 232 that consists of a number of array entries 233 and corresponding state entries 234. The cache controller 220 interfaces to a bus unit 240 via a command buffer 242, a response buffer 241, and three signals: BACKOFF 245, SNOOP 247, and SNOOP RESP 246. The bus unit 240 interfaces to a system bus via three system bus signal groups: ADDR 251, DATA 252, and CTRL 253.

In operation, program instructions are executed within sequential stages of the microprocessor pipeline core 210. The instructions are piped through these sequential stages in synchronization with a pipeline clock signal (not shown). A present day pipeline core 210 typically includes a stage or stages dedicated to performing memory access operations. For example, a "load" stage within the core 210 may be responsible for loading data from memory while a "store" stage performs the task of storing data to memory. Alternatively, a single "data" stage may be provided to perform both loads and stores. In either case, when a program instruction that requires access to a data entity from memory enters into the stage responsible for accessing memory, the pipeline core 210 provides information to the appropriate buffer (load buffer 222 for reads, store buffer 224 for writes) that enables the cache 230 to identify the data entity. The information provided typically consists of the memory address of the data entity along with its size (i.e., byte, word, doubleword, or quadword). For write operations, the data entity itself is also provided in the store buffer 224. The memory address is used by the cache controller 220 to index into the cache array 232 via INDEX 225 to determine if the requested data entity is present within a cache line 233 that resides within the cache 232. If the indexed cache line 233 is within the cache 232 and if the line's corresponding state field 234 indicates that the data within the line 233 is accessible, then the cache controller 220 accesses the data entity within the indexed cache line 233 via the cache data bus 227. For load operations, the cache controller 220 reads the data entity from the indexed cache line 233 and provides it to the load buffer 222, which then transfers the data entity to the core 210. For store operations, the cache controller 220 retrieves the data entity from the store buffer 224 and writes it to the appropriate byte positions within the indexed cache line 233. As can be observed from the present discussion, once the data entity is provided to the store buffer 224, a corresponding store instruction can then proceed to the next stage of the pipeline core 210; the cache controller 220 is responsible for completing the write operation to the cache 232. However, a load instruction must wait until the cache controller 220 accesses the data entity in the cache 232 and provides it via the load buffer 222 before proceeding to the next stage of the pipeline core 210. Hence, the load instruction is effectively stalled within the pipeline 210 until the data entity is retrieved.

If a requested data entity is in the cache 232 and if its state field 234 indicates that it is accessible, then the number of cycles required to provide it to the core 210 are negligible from the standpoint of program execution. If, however, the data entity's state field 234 indicates that the entity is not accessible or if the entity is not within the cache 232 at all, then external memory must be accessed. And memory accesses, as alluded to with reference to FIG. 1, cause significant delays within application programs. This is why it is so important that the cache logic 200 be designed to minimize the number of external memory accesses.

A cache "hit" refers to the case when the data entity is accessible within the cache. A cache "miss" refers to the case when external memory must be accessed. The cache 230 asserts MISS 226 to indicate a miss in response to the memory address provided by the cache controller 220 over INDEX 225. A read miss is a miss associated with an instruction requesting data from the data cache 230. A write miss is a miss associated with an instruction requesting that data be stored in the data cache 230.

When a read miss occurs, the data cache 230 reserves, or allocates, an entry 233 in the cache array 232 to hold the cache line containing the requested data entity yet to be retrieved from memory. The specific entry 233 that is allocated is determined by the address provided via INDEX 225 in accordance with a use algorithm as alluded to above. One skilled in the art will appreciate that there are a variety of use algorithms (e.g., true LRU, pseudo LRU, etc.) employed within present day microprocessors. The specific use algorithm employed by the cache logic 200 of FIG. 2 is not germane to the discussion herein. In addition, the cache controller 220 issues a memory read command to the command buffer 243 directing the bus unit 240 to perform a burst read of the cache line from memory. The burst read command is provided to the bus unit 240 via CMND 244. In accordance with the bus protocol employed by the specific computer system within which the cache logic 200 resides, the bus unit 240 requests access to the bus 251–253 and, upon being granted access to the bus 251–253, it executes the burst read of the cache line from memory via ADDR 251, DATA 252, and CTRL 253. As bytes of the cache line are being received over the bus 251–253, they are provided by the bus unit 240 via RESP 242 for temporary storage in the response buffer 241. When the cache line burst read has completed, then the cache line is retrieved from the response buffer 241 and provided to the cache 230 via the cache data bus 227. The cache 230 then stores the cache line in the allocated entry 233 and sets its state within the state field 234 to indicate that it is accessible by load instructions.

Following the cache line fill, the requested data entity is retrieved from the allocated cache line 233 and is provided to the load buffer 222 for access by the core 210. Upon retrieval of the data entity from the load buffer 222, the instruction that requested the data is allowed to proceed to the next stage of the pipeline 210.

In addition to the delays associated with cache line allocation upon read misses, other events can also stall an instruction's progress through the pipeline 210. One of these events, discussed above with reference to FIG. 1, occurs when a bus arbiter or other bus control device directs the data cache logic 200 to postpone, suspend, or cancel an access operation. Typically, such control of the bus is communicated to the bus unit 240 via the control signal group, CTRL 253. Accordingly, the bus unit 240 postpones, suspends, or cancels the operation and informs the cache controller 220 by asserting BACKOFF 245. In the event of a burst read, the cache controller 220, in turn, may choose to flush the response buffer 241 and reissue the burst read request, or it may choose to retain the partial contents of the response buffer 241 and request a read to access the remaining data within the cache line. In the event of a write to memory, the cache controller 220 may choose to repeat the write operation or to write only those bytes that remain. There are numerous events that can occur within a multiple bus master computer system configuration that can result in the data cache logic 200 being forced to back off of a bus transaction and these events vary from system to system. Furthermore, cache controllers 220 deal with back off scenarios in different ways, two of which are alluded to above. One skilled in the art will however appreciate that the backoff scenario discussed with reference to FIG. 2 exemplifies a representative present day computer system configuration.

For writes to memory, most microprocessors today employ what is known as a write-back policy within their data cache. Under this policy, if a cache hit occurs on a write, the cache line entry 233 within the data cache 232 is updated, but the data is not copied to external memory. Thus, when a write hit occurs, the cache controller 220 provides the data from the store buffer 224 to the data cache 230 via the cache data bus 227. The data cache 230 stores the bytes corresponding to the write operation in their appropriate byte positions in the indexed cache line entry 233 in the cache array 232. In addition, when the data is written to the indexed cache line 233, its corresponding state field 234 is updated to indicate that the indexed cache line 233 has been modified. No further action is taken until another device on the bus 251–253 requires access to the modified cache line 233.

When another device on the bus 251–253 requires access to the modified cache line 233, a bus snoop command is transmitted over the bus 251–253. Since the data cache logic 200 has modified the snooped cache line 233, the modified cache line 233 must first be written back to memory before the other device can be granted access. A bus snoop command is thus received by the bus unit 240 and the bus unit 240 communicates this inquiry to the cache controller 220 via the snoop bus, SNOOP 247. The cache controller 220 informs the bus unit 240 whether or not the particular cache line is within the cache array 232 via the snoop response bus, SNOOP RESP 246. When a snoop occurs, if the cache controller 220 is in the process of writing data to a snooped cache line entry 233 within the cache array 232, then the cache controller 220 may choose to postpone the operation, refill the line entry 233 from external memory, and then proceed to update the cache entry 233 with data corresponding to the write operation.

Bus backoffs and bus snoops complicate the management of entries 233 within a cache array 232 and can further delay the progression of instructions that direct memory accesses through the pipeline core 210. The preceding discussion has addressed operation of the data cache logic 200 with regard to read hits, read misses, and write hits. But the behavior of the data cache logic 200 in the presence of a write miss has yet to be described, particularly because the procedures for managing a cache 232 in the presence of a write miss continue to present problems for microprocessor designers.

A brute force approach for handling a write miss is to provide the contents of the store buffer 224 within a bus write command in the command buffer 243 and subsequently write the data entity to external memory over the bus 251–253. And since a write miss occurs when the cache line associated with a store operation is not within the cache 232 anyway, no other action on the part of the data cache logic 200 appears to be required. This approach is, in fact, what was implemented within early data cache logic designs. But this brute force approach, albeit straightforward, is not very intuitive. This is because, as was noted above with reference to the execution of load instructions, 1) application programs tend to access data that is stored close to a memory location that has already been accessed, and 2) application programs tend to access the most recently accessed locations again. These two principles apply not only to load operations; they also hold true for store operations. In other words, a write to memory is not an isolated event. If a program instruction in the pipeline 210 directs that a data entity be written to memory, then it is very likely that following instructions in the pipeline 210 will either cause a read or write to the data entity itself, or they will cause reads or writes to adjacent data entities within the corresponding cache line. Therefore, more recent data cache logic designs 200 carry out more intuitive actions upon a write miss; they cause the cache line corresponding to the write miss to be allocated, that is, loaded into the data cache 230. This manner of handling a write miss such that the corresponding cache line is loaded into the data cache 230 for future utilization is referred to as write allocation.

One approach to write allocation is to first write the data entity to memory and then load the corresponding cache line from external memory into the data cache 230. However, this approach is virtually never used because it requires two back-to-back bus accesses. The prevailing approach in the art for performing write allocation is to first read the cache line corresponding to the write miss into the data cache 230 and then write the data entity directly into the allocated cache line 233 within the cache array 232. This approach, implemented by many present day pipeline microprocessors, is referred to as blocking write allocate. Accordingly, only reads can cause an entry 233 in the data cache 232 to be allocated; when a write miss occurs, the cache controller 220 first provides a burst read command to the command buffer 243 directing the bus unit 240 to perform a cache line fill, thus prompting line allocation within the cache array 232. The cache line is retrieved into the response buffer 241 and is subsequently written into an allocated cache line entry 233. Following the cache line fill, the data associated with the write miss is stored in the appropriate byte positions within the allocated cache line entry 233 and the entry's state field 234 is updated to indicate that the line 233 has been modified.

Although the blocking write allocate technique is intended to provide for the potential data requirements of subsequent instructions in the pipeline 210, it also imposes a mandatory pipeline stall for all subsequent write instructions until the corresponding cache line is written into its allocated entry 233 in the cache array. The scenario that illustrates this drawback of blocking write allocate caches is more specifically discussed with reference to FIG. 3.

Figure 3:
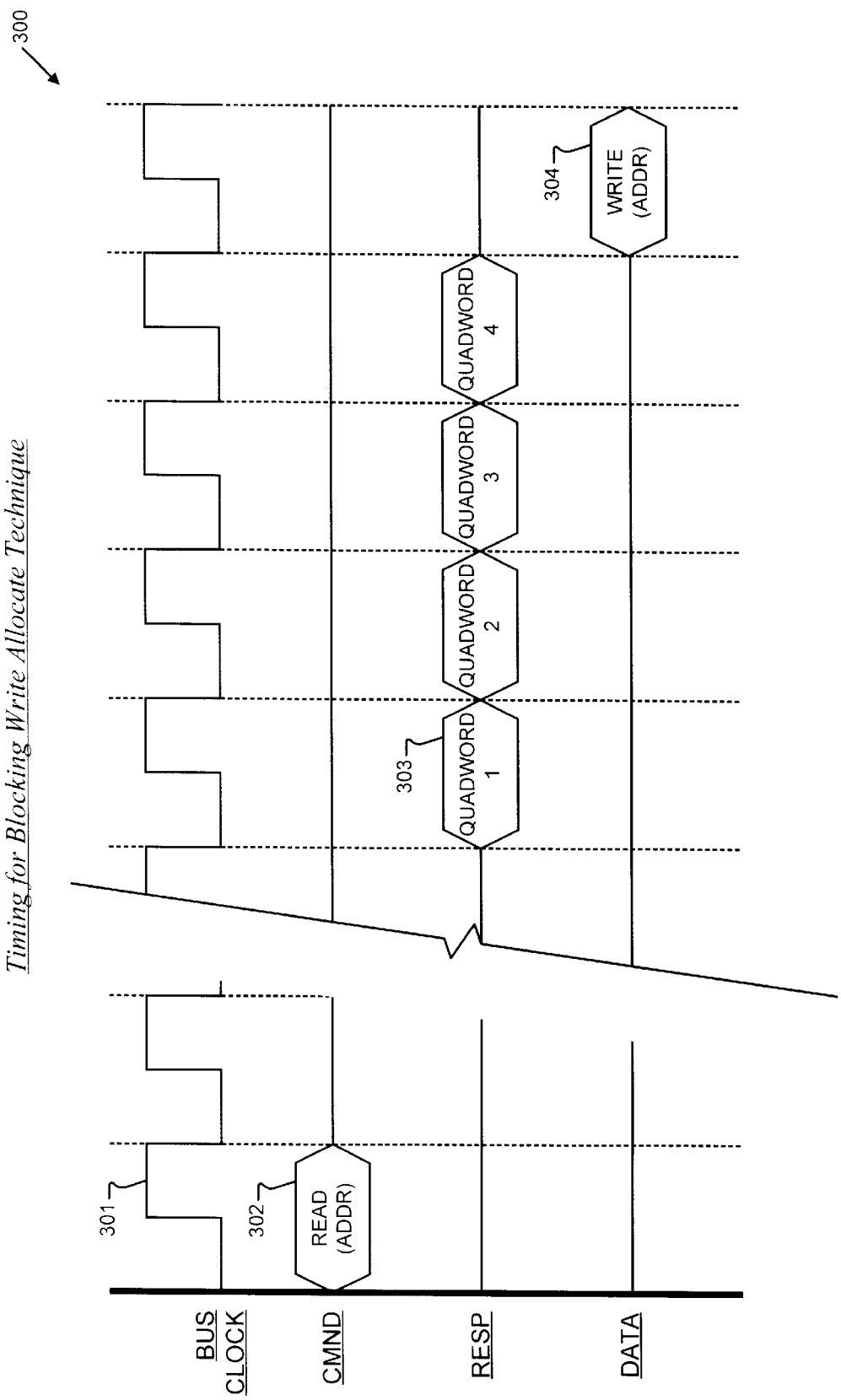
FIG. 3 is a timing diagram illustrating how the data cache logic of FIG. 2 allocates cache lines on writes to memory.

Referring to FIG. 3, a timing diagram 300 is presented illustrating how the data cache logic 200 of FIG. 2 allocates cache lines on writes to memory. The timing diagram 300 includes a bus clock signal 301, a command signal 302 depicting transmission of the contents of the command buffer 243 by the bus unit 240, a response signal 303 depicting reception of cache line data by the bus unit 240 for provision to the response buffer 241, and a data signal 304 reflecting activity over the cache data bus 227.

Operationally, when a write miss occurs within a cache system 200 that is blocking write allocate, before the data entity associated with the write miss can be stored, its corresponding cache line must first be read into the data cache 230 from external memory. Consequently, a burst read command 302 is issued from the command buffer 243 over the bus 251–253 by the bus unit 240. And although the data entity is temporarily buffered in the store buffer 224, thus allowing the instruction that instigated the write miss to proceed to the next stage of the pipeline 210, any subsequent instruction that reads or writes data to the corresponding cache line must be stalled until the cache line is received, allocated, and updated with the data entity. As shown in the timing diagram 300, some unpredictable number of bus cycles later, the response signal 303 indicates a four quad-word burst from external memory to the bus unit 240 that contains the 32 bytes of the corresponding cache line. Once all 32 bytes are received into the response buffer 241, an entry 233 is allocated in the cache array 232 and the data entity associated with the write miss is provided as shown by signal 304 to write the allocated cache line entry 233. Only after the write directed by DATA 304 occurs can instructions that require access to data in the allocated cache line 233 be allowed to execute.

The point at which the four quadword burst transpires over RESP 303 could conceivably be many cycles of BUS CLOCK 301 after the burst read command is issued over CMND 302. This is because access to main memory in a multiple bus master system is at best slow and unpredictable. And release of subsequent read/write instructions referencing the corresponding cache line is contingent upon timely reception of the burst fill over RESP 303. For subsequent read instructions, this problem is insurmountable; if the data required by the instructions is not already available within the data cache 230 then it absolutely must be retrieved from memory. Consequently, a compulsory stall is forced upon subsequent read instructions until the corresponding cache line is allocated and updated within the cache array 232. And within a present day blocking write allocate cache system 200, subsequent write instructions referencing the corresponding cache line are also stalled. This is a problem, particularly for those algorithms within application programs that write many elements of an array using successive write instructions.

The present inventors have observed that what holds true for subsequent read instructions following a cache write miss need not be the case for subsequent write instructions. By providing a means for tracking byte activity corresponding to multiple write instructions within a data cache, the present invention overcomes the limitations of data cache logic within present day pipeline microprocessors. The present invention is more specifically discussed with reference to FIGS. 4 through 10.

Figure 4:
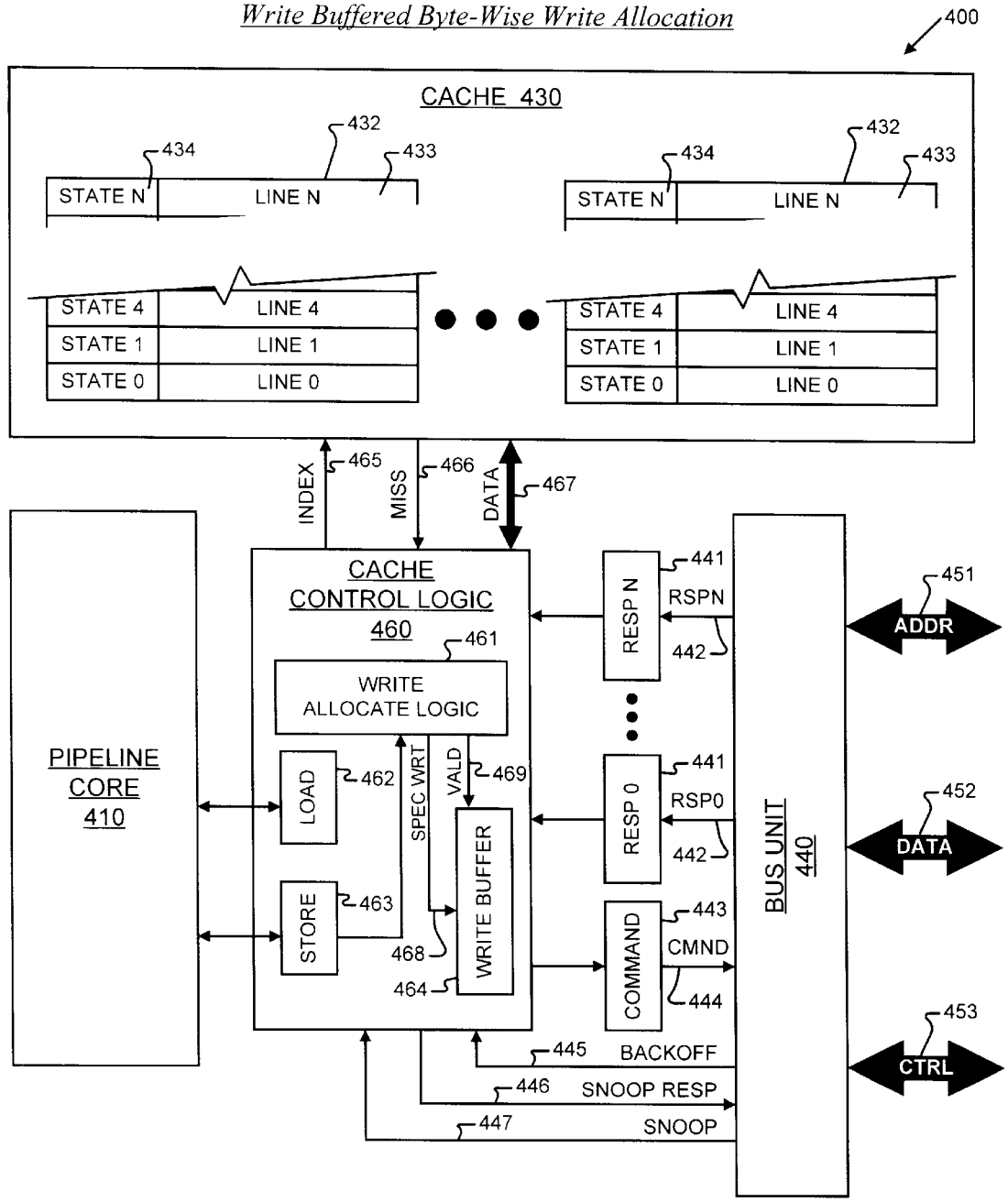
FIG. 4 is a block diagram depicting a microprocessor according to the present invention for performing byte-wise tracking on cache line write allocations.

Referring to FIG. 4, a block diagram is presented depicting a microprocessor 400 according to the present invention for performing byte-wise tracking on cache line write allocations. The microprocessor 400 has a pipeline core 410 that is coupled to cache control logic 460 via a load buffer 462 and a store buffer 463. The cache control logic 460 includes write allocate logic 461 that is coupled to a write buffer 464 via a speculative write command bus (SPEC WRT) 468 and a validate bus (VALD) 469. The cache control logic 460 is connected to a data cache 430 via an index bus (INDEX) 465, a miss signal (MISS) 466, and a cache data bus (DATA) 467. The cache 430 includes a plurality of cache arrays 432, each consisting of an equal number of array entries 433 and corresponding state entries 434. The cache arrays 432 are also referred to as cache ways 432. In one embodiment, each of four cache ways 432 holds 512 32byte cache lines 433. The cache control logic 460 interfaces to a bus unit 440 via a command buffer 443, a plurality of response buffers 441, and three control signals: BACKOFF 445, SNOOP 447, and SNOOP RESP 446. The bus unit 440 interfaces to a system bus via three system bus signal groups: ADDR 451, DATA 452, and CTRL 453. In one embodiment, there are two response buffers 441. The plurality of response buffers 441 allows for a plurality of burst reads to be active in parallel.

Operation of many of the elements within the microprocessor 400 according to the present invention is very similar to like-numbered elements described with reference to FIG. 2, the hundreds digit being replaced with a 4. Program instructions are executed within sequential stages of the microprocessor pipeline core 410 and are piped through these sequential stages in synchronization with a pipeline clock signal (not shown) When a program instruction that requires access to a data entity from memory enters into the stage responsible for accessing memory, the pipeline core 410 provides information to the appropriate buffer (load buffer 462 for reads, store buffer 463 for writes) that enables the cache 430 to locate the data entity. The cache control logic 460 indexes into the cache ways 432 via INDEX 465 to determine if the requested data entity is present. If the cache line 433 corresponding to the data entity is within the cache 432 and if the line's corresponding state field 434 indicates that the data within the line 433 is accessible, then the cache control logic 460 accesses the data entity within the indexed cache line 433 via the cache data bus 467. For load operations, the cache control logic 460 reads the data entity from the indexed cache line 433 and provides it to the load buffer 462, which then transfers the data entity to the core 410. For store operations, the cache control logic 460 retrieves the data entity from the store buffer 464 and writes it to the appropriate byte positions within the indexed cache line 463. Multiple cache ways 432 are provided to increase the probability of a hit. In addition, the present invention expedites the indexing and retrieval of cache line entries 433 within the data cache 430 by allowing simultaneous access to more than one entry 433 at a time. In one embodiment, two cache line entries 433 can be accessed in parallel by the cache control logic 460.

Data cache logic within the microprocessor 400 according to the present invention can have multiple burst reads active in parallel and it can read/write multiple cache line entries 433 in parallel, thus alleviating some of the indeterminate latencies associated with external memory accesses. But otherwise, with regard to its function in the presence of read hits, read misses, and write hits, operation of the data cache logic according to the present invention is like that described with reference to FIG. 2.

A significant distinction between the present invention and prior art revolves around its operation in the presence of write misses. This is because the microprocessor 400 according to the present invention employs an allocate on write policy in response to a write miss as opposed to an blocking write allocate policy. To implement this policy, a byte-wise tracking apparatus (not shown) is utilized to keep track of bytes written to an allocated cache line prior to when the line is filled from memory.

In accordance with this allocate on write policy for write allocation, when a write miss occurs, write allocation logic 461 within the cache controller 460 directs the data cache 430 to allocate an entry 433 within one of the cache ways 432 for the corresponding data entity. The cache 430 allocates the entry 433 using address information provided via INDEX 465. The write allocate logic 461 retrieves the corresponding data entity from the store buffer 463 and provides it to the data cache 430 via DATA 467. The cache 430 in turn writes the data entity to corresponding byte positions within the allocated cache line entry 433 and marks the byte positions that have been written in the byte-wise tracking logic. In parallel, the cache control logic 460 causes a burst read command for the corresponding cache line to be issued by the bus unit 440. Also in parallel, the write allocate logic 461 queues a speculative write command within the write buffer 464 via SPEC WRT 468 and sets the state of the speculative write command to invalid via VALD 469. The speculative write command is a write command which, if validated, causes a bus write command to be transferred to the command buffer 443, thereby writing the corresponding data entity to external memory. The speculative write command is buffered and invalidated in the write buffer 464 to provide a fallback means for updating the cache line in memory if a snoop or backoff interrupts the cache line fill. Accordingly, the cache control logic 460 monitors the state of commands in the write buffer 464 and only forwards validated write commands to the command buffer 443 for transmission over the bus 451–453.

Once the corresponding cache line is retrieved from memory into one of the response buffers 441, it is then provided to the cache 430 via DATA 467. The cache 430 examines the byte-wise tracking logic to determine which byte positions of the allocated cache line entry 433 have been already written. Thus, only the remaining bytes of the allocated cache line 433 are updated with the cache line data retrieved from memory.

The present invention not only provides a way for data corresponding to a write miss to be immediately written to cache 430, but is also allows subsequent write instructions to the same allocated cache line 433 to write to the allocated cache line 433 and thereby continue to progress through the pipeline 410 without being stalled. Even while the bus unit 440 is waiting for the corresponding cache line to be provided over the bus 451–453, when subsequent write commands are retrieved from the store buffer 463, their corresponding data is stored to the allocated cache line entry 433; the cache logic 430 continues to designate those byte positions which are written. In fact, a subsequent write command can write over the same byte positions as a previous write command without experiencing delay.

If a backoff occurs, or if a snoop is received that corresponds to the allocated cache line 433, then the write allocate logic 461 directs the write buffer 464 via VALD 469 to validate all of the speculative write commands within the buffer 464, thereby ensuring that memory is updated with data corresponding to writes which have been made to the allocated cache line 433. The cache logic 430 also updates the state field 434 corresponding to the allocated cache line entry 433 to indicate that it is not accessible, i.e., the data within is invalid. Also, in the event of a bus snoop, the cache control logic 460 provides a response to the snoop via SNOOP RESP 446 indicating that the snooped cache line is not present within the cache. Thus backoff and snoop events result in writes to external memory; the allocate on write operations within the cache 430 are cancelled during interrupted cache line fills corresponding to the write allocation.

Figure 5:
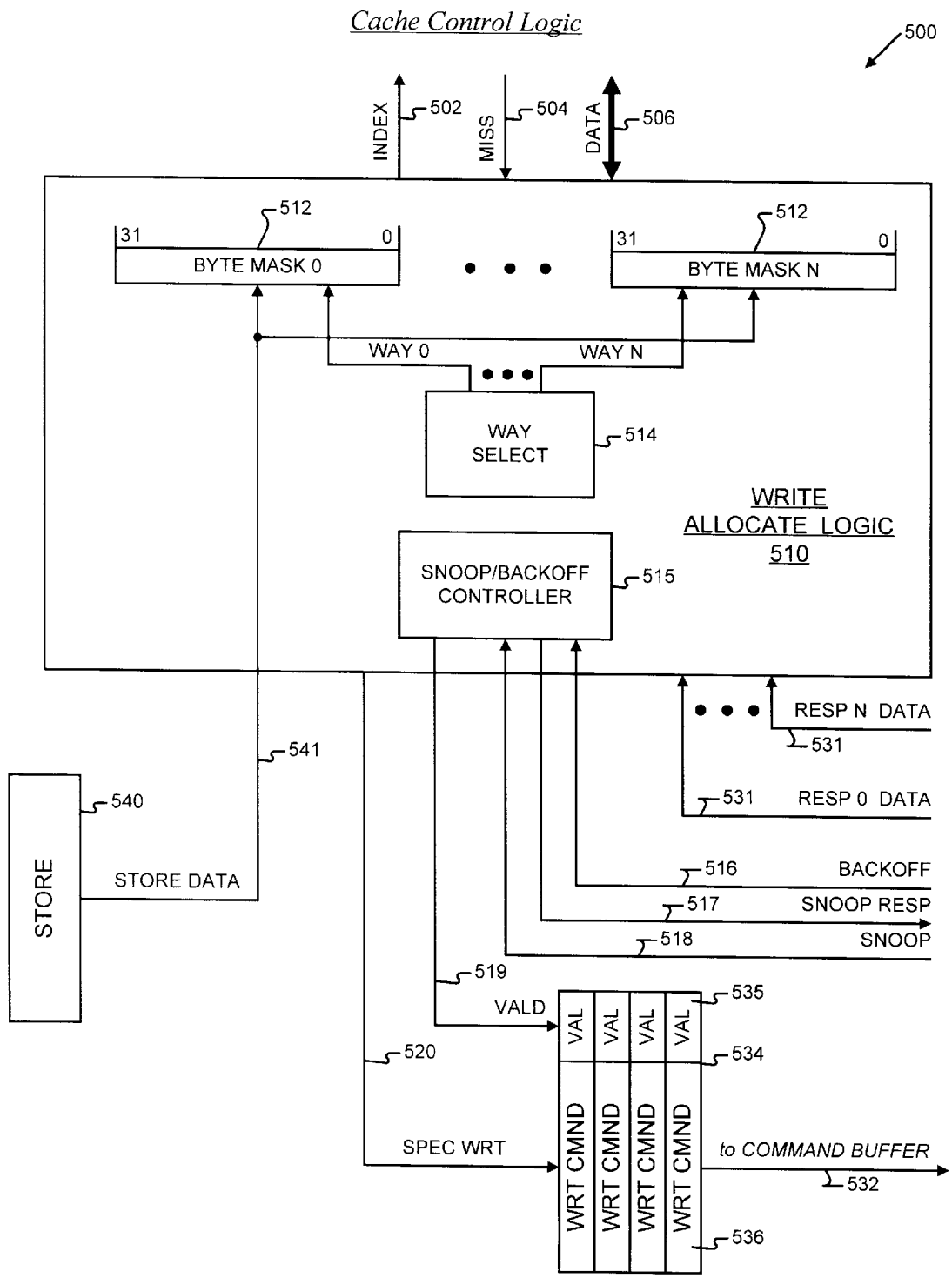
FIG. 5 is a block diagram illustrating details of the cache control logic within the microprocessor of FIG. 4.

Now referring to FIG. 5, a block diagram is presented illustrating details of cache control logic 500 within the microprocessor of FIG. 4. The cache control logic 500 has a store buffer 540 that provides data corresponding to a write miss to write allocate logic 510 via a store data bus (STORE DATA) 541. Within the write allocate logic 510, STORE DATA 541 is routed to a plurality of byte-wise tracking masks, (BYTE MASK 0 through BYTE MASK N) 512. The write allocate logic 510 also includes way select logic 514 and a snoop/backoff controller 515. The write allocate logic 510 interfaces to a data cache (not shown) according to the present invention via INDEX 502, MISS 504, and DATA 506. Cache line data from a plurality of response buffers (not shown) according to the present invention is provided to the write allocate logic 510 via a corresponding plurality of response data buses (RESP 0 DATA–RESP N DATA) 531. Control signals BACKOFF 516, SNOOP RESP 517, and SNOOP 518 are routed from a bus unit (not shown) according to the present invention to the snoop/backoff controller 515. The cache control logic 500 also includes a speculative write buffer 534 consisting of a plurality of command entries, each of the entries having a command field 536 and a validation field 535. In one embodiment, the speculative write buffer 534 has four entries. The speculative write buffer 534 receives speculative write commands from the write allocate logic 510 via a speculative write command bus (SPEC WRT) 520, and the snoop/backoff controller 515 validates the speculative write commands in the buffer 534 via VALD 519.

Operationally, when a write miss occurs, a data entity corresponding to the write miss is retrieved from the store buffer 540 and is provided to the write allocate logic 510 via STORE DATA 541. The way select logic 514 enables one of a plurality of cache ways (not shown) for cache line allocation. In addition, a byte-wise tracking mask 512 corresponding to the enabled cache way is selected to track writes made to the allocated cache line until the cache line data is provided via one of the response buses 531. In one embodiment, the byte-wise tracking masks 512 are 32-bit registers capable of tracking writes to 32-byte cache lines. In addition to tracking bytes written to the allocated cache line, the write allocate logic 510 queues a speculative write command corresponding to the write that instigated the cache line allocation via SPEC WRT 520. The speculative write command is provided to the write buffer 534 with its validation field 535 marked invalid. In the event of a backoff or snoop to the allocated cache line, then the snoop/backoff controller 515 asserts VALD 519, thus validating all of the speculative write commands within the buffer 534. The cache control logic 500 forwards validated speculative write commands from the speculative write buffer 534 to a command buffer according to the present invention (not shown) via bus 532.

During the period when the write allocate logic 510 is waiting for a cache line fill corresponding to the allocated cache line to complete, load instructions referencing the allocated cache line are stalled in the pipeline. In contrast however to the data cache logic 200 discussed with reference to FIGS. 2 and 3, write instructions to an allocated cache line according to the present invention are allowed to execute. For example, say a first write instruction writing a data entity to bytes 15-0 causes a cache write miss. In response to the miss, a cache line is allocated and byte positions 15-0 are written to the allocated cache line. In addition, bits 15-0 of the corresponding byte mask 512 are asserted to indicate that bytes 15-0 of the allocated cache line have been written. Suppose another write command follows that directs a store to byte positions 7-0 of the allocated cache line. The following write command is allowed to execute and proceed through the pipeline; bytes 7-0 are written in the allocated cache line with the data corresponding to the following write command. The way select logic 514 does not change the state of bits 7-0 of the corresponding byte mask 512 because the bits already indicate that byte positions 7-0 of the allocated cache line have been written by the first write command. Both write commands are queued to the speculative write buffer 534 in case fill of the corresponding cache line is interrupted.

When the corresponding cache line data is provided via one of the response data buses 531, then the corresponding byte mask 512 is applied to the data, which in this case masks off bytes 15-0. Consequently, when the cache line data is written to the allocated entry within the data cache, only bytes 31-16 are updated. Upon update of the allocated cache line, the write allocate logic 510 flushes the speculative write commands from the speculative write buffer 534.

Figure 6:
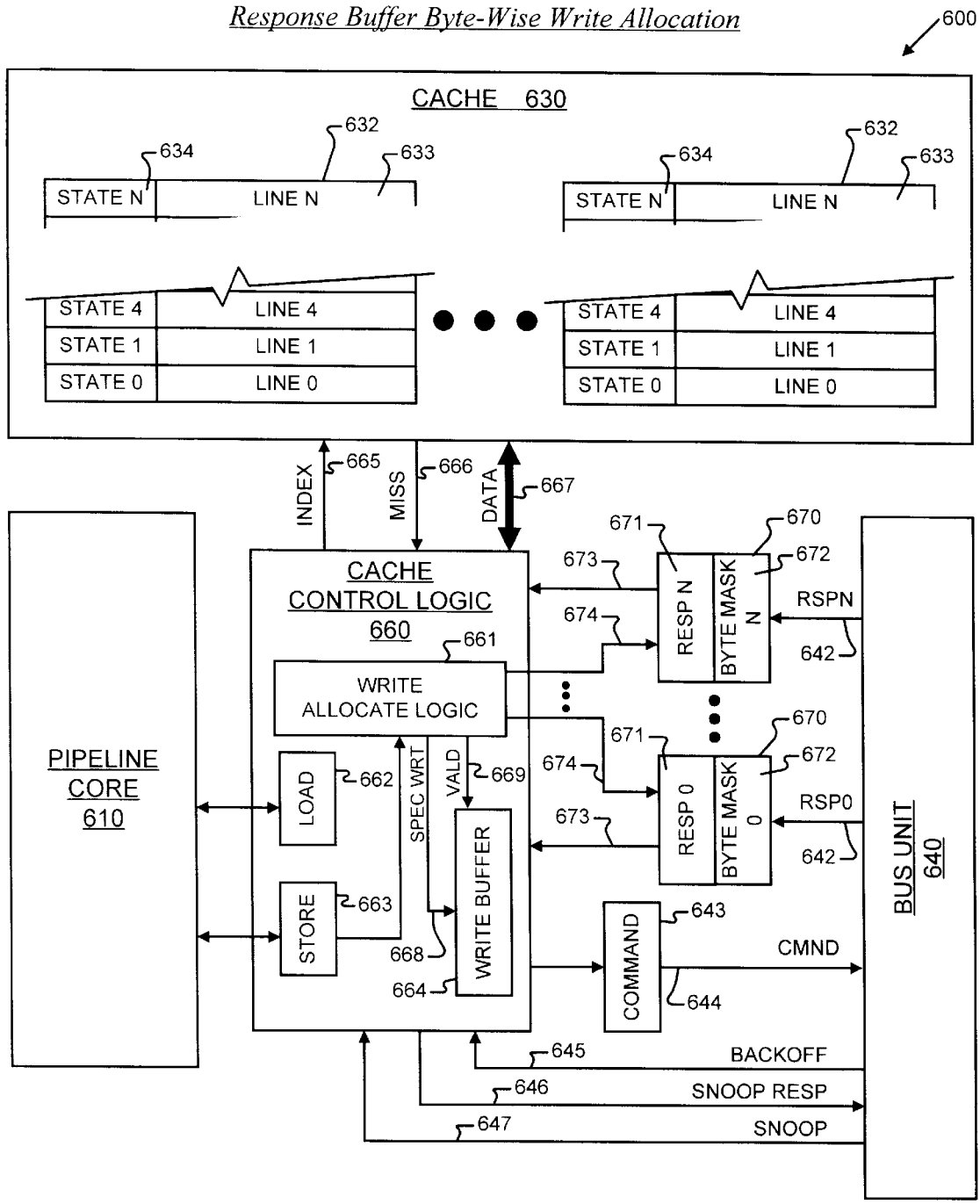
FIG. 6 is a block diagram depicting an alternative embodiment of a microprocessor according to the present invention.

Now referring to FIG. 6, a block diagram is presented depicting an alternative embodiment of a microprocessor 600 according to the present invention. The microprocessor 600 has a pipeline core 610 that is coupled to cache control logic 660 via a load buffer 662 and a store buffer 663. The cache control logic 660 includes write allocate logic 661 that is coupled to a write buffer 664 via a speculative write command bus (SPEC WRT) 668 and a validate bus (VALD) 669. The cache control logic 660 is connected to a data cache 630 via an index bus (INDEX) 665, a miss signal (MISS) 666, and a cache data bus (DATA) 667. The cache 630 includes a plurality of cache ways 632, each consisting of an equal number of array entries 633 and corresponding state entries 634. In one embodiment, each of four cache ways 632 holds 512 32-byte cache lines 633. The cache control logic 660 interfaces to a bus unit 640 via a command buffer 643, a plurality of response buffers 670, and three control signals: BACKOFF 645, SNOOP 647, and SNOOP RESP 646. In one embodiment, there are two response buffers 670. Also in this alternative embodiment, the response buffers 670 each have a byte-wise tracking register 672 and a response register 671. The byte-wise tracking register 672 masks incoming cache line byte positions as cache line data is received. Data bytes are filtered by the byte masks 672 and are provided to corresponding response registers 671. Byte-wise tracking information is provided by the write allocate logic 661 to each of the byte masks 672 via corresponding byte mask buses 674.

Operationally, the elements within the alternative embodiment microprocessor 600 is similar to like-numbered elements described with reference to the microprocessor 400 of FIG. 4, the hundreds digit being replaced with a 6. The distinction between the embodiment of FIG. 4 and the embodiment of FIG. 6 focuses on where data corresponding to an allocated cache line is stored prior to completion of a corresponding cache line fill. In the embodiment of FIG. 6, upon a write miss, an entry 633 within one of the cache ways 632 is allocated, however, the data from the store buffer 663, rather than being directly stored in the allocated cache line, is written to one of the response registers 671 selected by the write allocate logic 661. The corresponding byte mask 672 is updated to designate written byte positions within the response register 671. The byte mask 672 controls which incoming cache line bytes are masked off when they are written to the response register 671. Writes in the pipeline 610 can continue to be executed until the fill is completed. Upon complete reception of the cache line data, the cache control logic 660 provides the contents of the response register 671 to the cache 630, which updates the allocated cache line entry 633.

Figure 7:
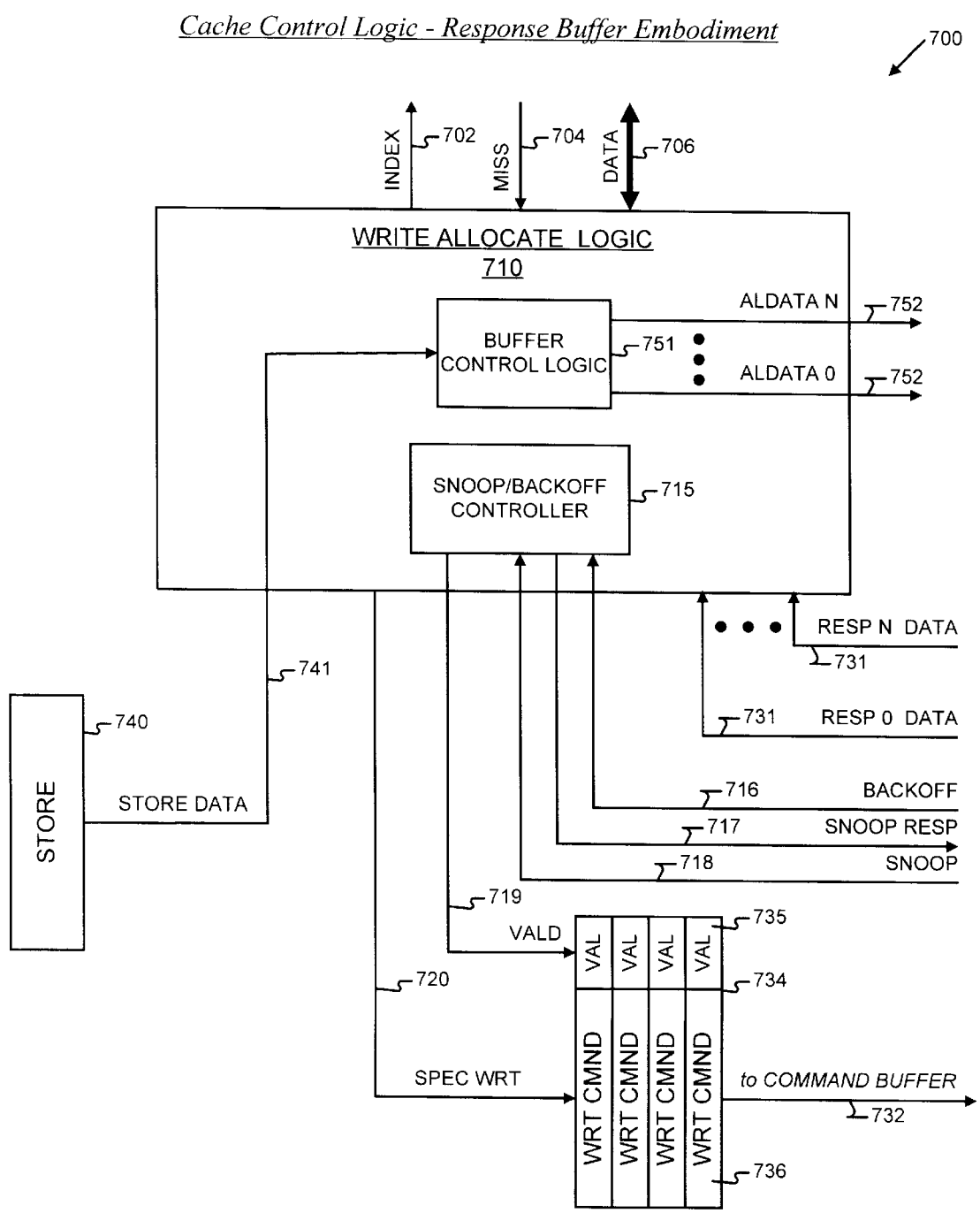
FIG. 7 is a block diagram illustrating details of the cache control logic within the microprocessor of FIG. 6.

Now referring to FIG. 7, a block diagram is presented illustrating details of the cache control logic 700 within the microprocessor of FIG. 6. The cache control logic 700 has a store buffer 740 that provides data corresponding to a write miss to write allocate logic 710 via a store data bus (STORE DATA) 741. Within the write allocate logic 710, STORE DATA 741 is routed to a buffer control logic 751. Write data corresponding to allocated cache lines is provided to response buffers (not shown) according to the present invention via allocated data buses (ALDATA 0–ALDATA N) 752. The write allocate logic 710 also includes a snoop/backoff controller 715. The write allocate logic 710 interfaces to a data cache (not shown) according to the present invention via INDEX. 702, MISS 704, and DATA 706.

Cache line data from the response buffers is provided to the write allocate logic 710 via response data buses (RESP 0 DATA–RESP N DATA) 731. Control signals BACKOFF 716, SNOOP RESP 717, and SNOOP 718 are routed from a bus unit (not shown) according to the present invention to the snoop/backoff controller 715. The cache control logic 700 also includes a speculative write buffer 734 consisting of a plurality of command entries, each of the entries having a command field 736 and a validation field 735. The speculative write buffer 734 receives speculative write commands from the write allocate logic 710 via a speculative write command bus (SPEC WRT) 720, and the snoop/backoff controller 715 validates the speculative write commands in the buffer 734 via VALD 719.

Operationally, elements of the cache control logic 700 according to the embodiment shown in FIG. 7 function similar to like-number items in FIG. 5, the hundreds digit being replaced with a 7. The difference between the two embodiments is that rather than writing allocated cache line data directly to an allocated cache line in the data cache, the buffer control logic 751 selects a response buffer for the cache line associated with the allocation. On a corresponding allocated data bus 752, the buffer control logic 751 writes the data corresponding to the write to the response buffer and the response buffer designates the bytes written in its byte mask register (not shown).

During the period when the write allocate logic 710 is waiting for a cache line fill corresponding to the allocated cache line to complete, write instructions to the allocated cache line are allowed to continue execution in the pipeline and their data is provided to the selected response buffer via the corresponding allocated data bus 752.

When the cache line fill is complete into the selected response buffer, then the contents of the selected response buffer are written to the allocated cache line entry within the data cache. Upon update of the allocated cache line, the write allocate logic 710 flushes speculative write commands from the speculative write buffer 734.

Figure 8:
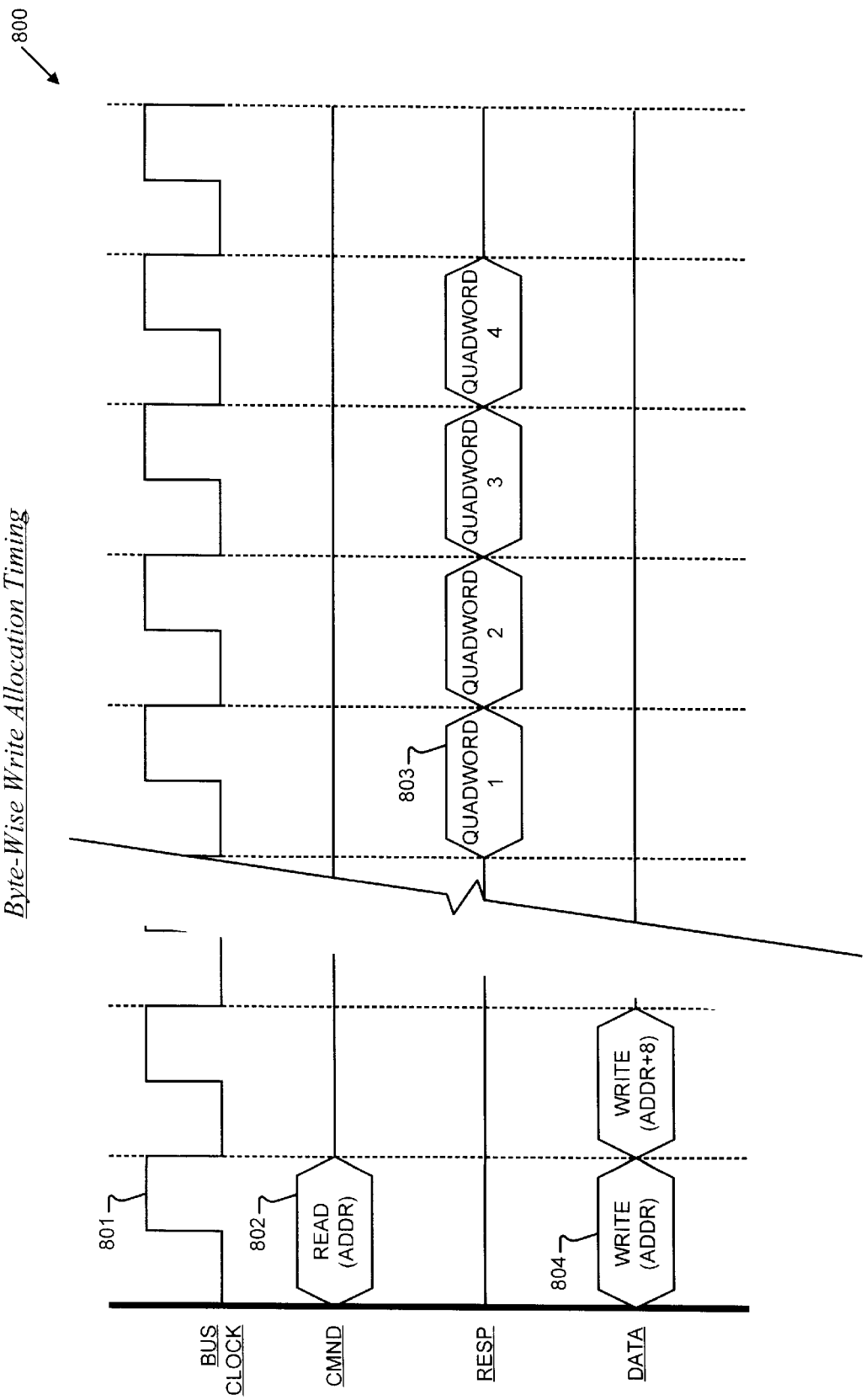
FIG. 8 is a timing diagram illustrating how the microprocessor of FIG. 4 allocates cache lines on writes to memory.

Now referring to FIG. 8, a timing diagram 800 is presented illustrating how the microprocessor of FIG. 4 allocates cache lines on writes to memory. Like the timing diagram 300 of FIG. 3, the timing diagram 800 according to the present invention includes a bus clock signal 801, a command signal 802 depicting transmission of the contents of the command buffer 443 by the bus unit 440, a response signal 803 depicting reception of cache line data by the bus unit 440 for provision to a selected response buffer 441, and a data signal 804 reflecting activity over the cache data bus 467.

Operationally, when a write miss occurs within a cache system according to the present invention, the data entity associated with the write miss can immediately be stored, prior to reception of the corresponding cache line from external memory. In parallel, a burst read command 802 is issued from the command buffer 443 over the bus 451–453 by the bus unit 440 and the data entity is stored within an allocated cache line entry 433 in a selected cache way 432. And although the number of cycles required to fill the corresponding cache line from memory are indeterminate, subsequent write instructions to locations within the allocated cache line 433 can continue to execute through the pipeline 410. The data signal 804 illustrates a write to an address, ADDR, which instigates allocation of the entry 433 within the cache 430 followed by a write to another address, ADDR+8, within the same allocated cache line 433. Both of the writes can proceed. In fact, any number of writes to the allocated cache line can proceed until the until some unpredictable number of bus cycles later, when the response signal 803 indicates a four quadword burst from external memory to the bus unit 440 that contains the 32 bytes of the corresponding cache line. Once all 32 bytes are received into the response buffer 441, the bytes positions already written by writes in the pipeline 410 are masked off by a corresponding byte-wise tracking mask and the remaining bytes of the cache line are updated into the allocated entry 433.

Figure 9:
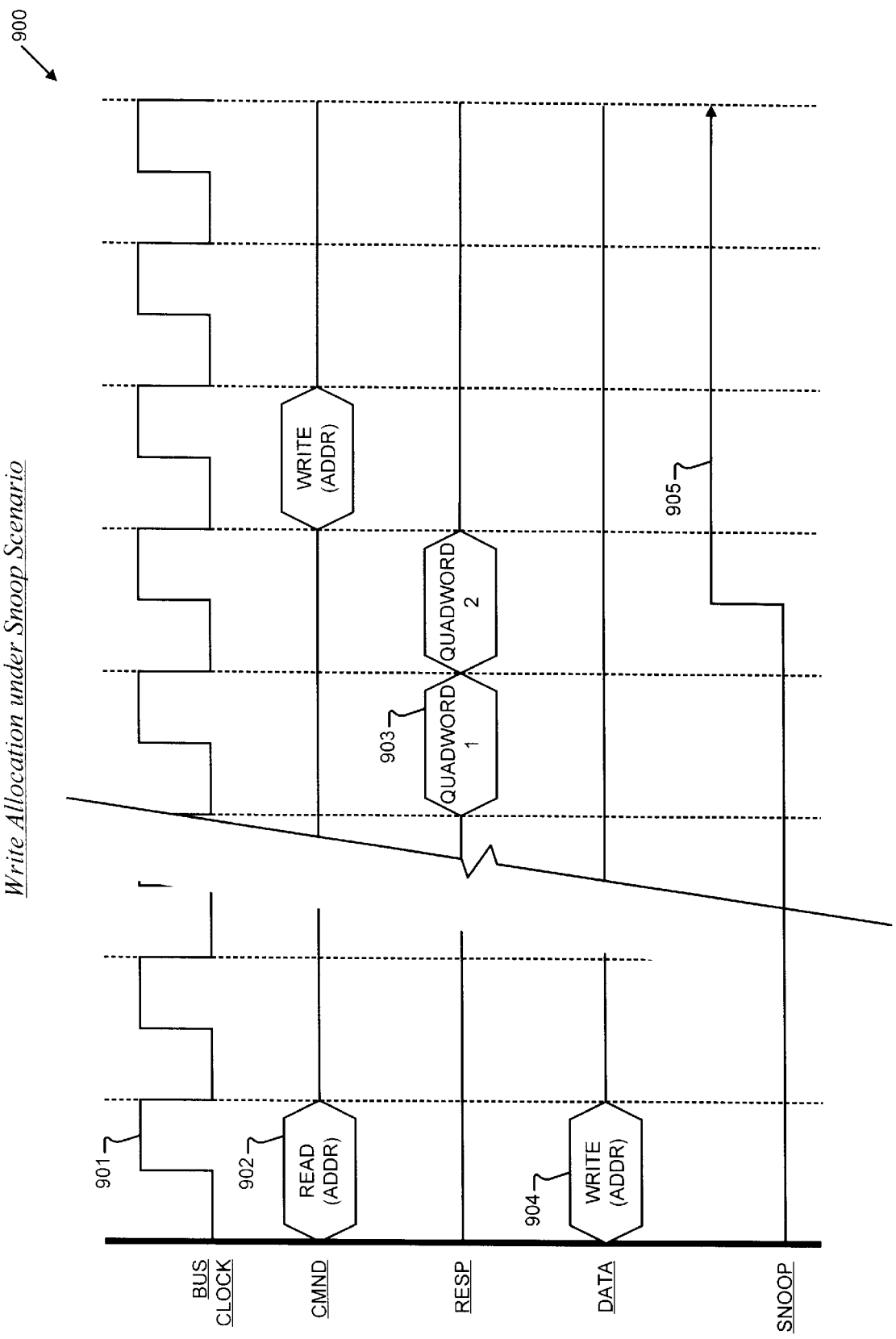
FIG. 9 is a timing diagram illustrating how the microprocessor of FIG. 4 handles a bus snoop during a cache line fill associated with a write allocation.

Now referring to FIG. 9, a timing diagram 900 is presented illustrating how the microprocessor of FIG. 4 handles a bus snoop during a cache line fill associated with a write allocation. The timing diagram 900 includes a bus clock signal 901, a command signal 902 depicting transmission of the contents of the command buffer 443 by the bus unit 440, a response signal 903 depicting reception of cache line data by the bus unit 440 for provision to a selected response buffer 441, a data signal 904 reflecting activity over the cache data bus 467, and a snoop signal 905 depicting activity over the snoop bus 447.

Operationally, as discussed with reference to FIG. 8, a write miss causes a burst read command 802 to be issued from the command buffer 443 over the bus 451–453 by the bus unit 440 in parallel with storage of the data entity corresponding to the write miss within an allocated cache line entry 433. In conjunction with these parallel operations, the write allocate logic 461 queues a speculative write command within the speculative write buffer 464 and designates it as invalid. During the intervening cycles until the cache line is filled, if a snoop occurs referencing the allocated cache line, then the write allocate logic 461 validates the speculative write command and it is subsequently issued to the bus 451–453 to write the data to memory. This is illustrated in FIG. 9 as the snoop signal 905 indicates a snoop of the allocated cache line during the bus cycle when quadword 2 is being transferred over the response signal 903. In accordance with the bus protocol employed, the cache line fill may or may not be immediately terminated. Signal 903 indicates immediate termination of the fill, however, the significant event that occurs is that the speculative write command corresponding to the write allocation is validated in response to the snoop and is issued during the next cycle of the bus clock 901 as is shown by signal 902.

Figure 10:
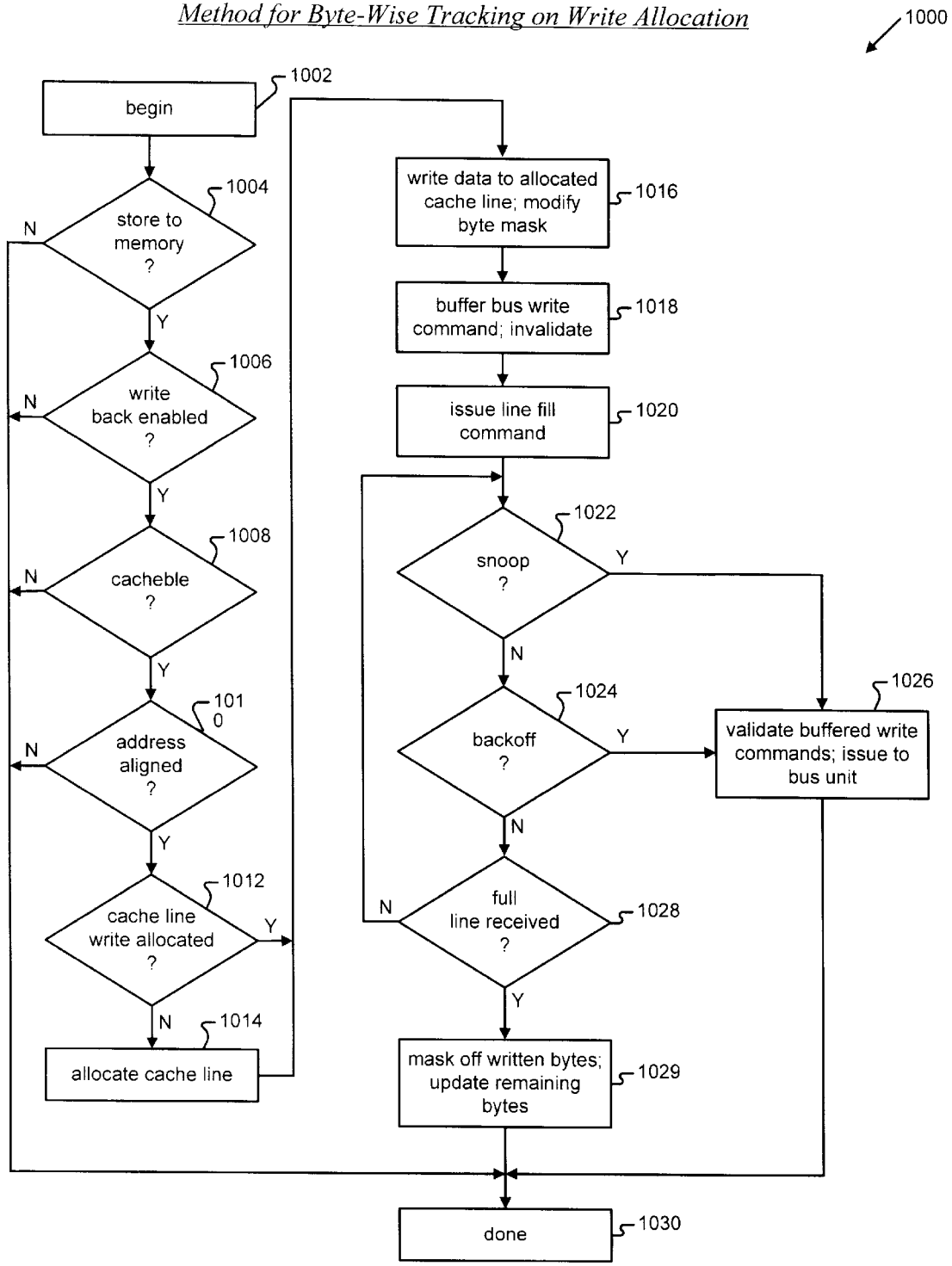
FIG. 10 is a flow chart illustrating a method according to the present invention for performing byte-wise tracking of allocated cache lines associated with writes to memory.

Now referring to FIG. 10, a flow chart 1000 is presented illustrating a method according to the present invention for performing byte-wise tracking of allocated cache lines associated with writes to memory.

Flow begins in block 1002 where a program instruction within a pipeline microprocessor according to the present invention is provided. Flow then proceeds to decision block 1004.

At decision block 1004, the program instruction is evaluated to determine if it directs that a data entity be stored to an address in memory. If so, then flow proceeds to decision block 1006. If a data store to memory is not directed by the program instruction, then flow proceeds to block 1030.

At decision block 1006, data cache logic within the microprocessor determines if write-back policy is employed for a cache line corresponding to the address. If write-back is not enabled for the cache line, then flow proceeds to block 1030. If write-back is enabled, then flow proceeds to decision block 1008.

At decision block 1008, control signals from the system bus are evaluated to determine if the cache line corresponding to the address is indeed cacheable, that is, whether or not the cache line can be read into the microprocessor's data cache. If the line is cacheable, then flow proceeds to decision block 1010. If not, then flow proceeds to block 1030.

At decision block 1010, the address corresponding to the write is evaluated to determine if the data is aligned, that is, if all of the data lies within a single cache line of if the data is split between more than one cache line. If the data is aligned, then flow proceeds to decision block 1012. If the data is unaligned, then flow proceeds to block 1030.

At decision block 1012, a data cache within the microprocessor is queried to determine if a cache line corresponding to the write directed by the program instruction has already been write allocated. If so, then flow proceeds to block 1016. If there is no allocated cache line, i.e., a cache write miss, then flow proceeds to block 1014.

At block 1014, since this is a first write upon a write miss to the cache, then write allocate logic within the microprocessor allocates a line in a selected cache way. Flow then proceeds to block 1016.

At block 1016, the data corresponding to the write directed by the program instruction is written to the allocated cache line within the cache. In addition, a byte mask corresponding to the write is updated to indicate those byte positions within the allocated cache line which are written. Flow then proceeds to block 1018.

At block 1018, a speculative write command directing a write of the data to memory is queued within a speculative write buffer and marked invalid. Flow then proceeds to block 1020.

At block 1020, a burst read command is issued over the system bus directing a fill of the cache line corresponding to the allocated entry in the cache. Flow then proceeds to decision block 1022.

At block 1022, control signals over the system bus are monitored to determine if a snoop has occurred that references the allocated cache line. If not, then flow proceeds to decision block 1024. If a snoop has occurred, then flow proceeds to block 1026.

At decision block 1024, the bus control signals are monitored to determine if a backoff event has been directed by bus arbitration logic. If not, then flow proceeds to decision block 1028. If a backoff has been directed, then flow proceeds to block 1026.

At block 1026, in response to a snoop or backoff event, the write allocate logic validates the speculative write commands within the speculative write buffer and the writes are posted over the system bus. Flow then proceeds to block 1030.

At block 1028, the status of the cache line fill is monitored to determine whether the fill is still in progress or whether the fill is complete. If the fill is still in progress, then flow proceeds to decision block 1022. If the fill is complete, then flow proceeds to block 1029.

At block 1029, byte positions previously written within the allocated cache line are masked off of the cache line fill data. Only remaining bytes from the fill are used to update the allocated cache line. Flow then proceeds to block 1030.

At block 1030, the method completes.

Although the present invention and its objects, features, and advantages have been described in detail herein, other embodiments are encompassed by the invention. For example, the present invention has been particularly characterized in terms of a data cache within a pipeline microprocessor that consists of a number of cache ways having 32-byte cache line entries. The architecture of the data cache, however, is not particularly germane to the present invention, but only serves to illustrate its applicability. The present invention is beneficial to any range of cache line sizes and architectures in that cache lines are allocated on writes instead of reads.

In addition, the present invention has been particularly discussed in terms of a data cache within a pipeline microprocessor. And although write miss delays are significantly prevalent in present day data cache devices, it is noted that these delays can also occur within an instruction cache, that is, a cache used to fetch program instructions from memory. And although writes to instruction caches are less frequent than writes to data caches, they do occur in application programs that exhibit self-modifying code-that is, instructions that are modified as a function of events surrounding execution of the applications. The present invention can readily be employed to enable write allocation within an instruction cache thereby expediting the execution of such application programs.

Finally, it should be apparent to those skilled in the art that the description of instruction fetch logic according to the present invention is illustrative in the sense that a pipeline microprocessor is used as a principle descriptive platform. But as was alluded to with reference to FIG. 1, pipeline microprocessors are only one of the devices that employ a data cache to preclude memory access delays. Other devices include special purpose processors such as array processors, graphics processors, and signal processors. The present invention certainly anticipates any cache architecture within these devices as well.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus in a pipeline microprocessor for allocating a first cache line within a data cache upon a write to an external memory location that is not presently within the data cache, the apparatus comprising:
    write allocate logic, configured to store first bytes within the first cache line corresponding to the write, to update remaining bytes of the first cache line from memory, and to queue a speculative write command directing an external bus to store said first bytes to the external memory location; and
    a write buffer, coupled to said write allocate logic, configured to buffer said speculative write command, and configured to issue said speculative write command to said external bus when update of said remaining bytes is interrupted.

2. The apparatus as recited in claim 1, wherein the first cache line comprises 32 bytes, and wherein the sum of said first bytes and said remaining bytes equals 32 bytes.

3. The apparatus as recited in claim 1, wherein the data cache comprises a plurality of cache ways, each of said plurality of cache ways comprising an equal number of cache lines.

4. The apparatus as recited in claim 3, wherein said write allocate logic selects the first cache line from one of said plurality of cache ways.

5. The apparatus as recited in 4, further comprising:
    a plurality of byte mask registers, each of said plurality of byte mask registers corresponding to said each of said plurality of cache ways, wherein contents of one of said plurality of byte mask registers denote first byte positions within the first cache line where said first bytes are stored by said write allocate logic.

6. The apparatus as recited in claim 5, wherein said contents of said one of said plurality of byte mask registers also denote remaining byte positions within the first cache line where said remaining bytes are to be stored.

7. The apparatus as recited in claim 3, further comprising:
    a plurality of response buffers, coupled to said write allocate logic, each of said plurality of response buffers configured to temporarily store one of said cache lines as it is being received from said external bus.

8. The apparatus as recited in claim 7, wherein said write allocate logic selects one of said plurality of response buffers within which to store said first bytes and to update said remaining bytes, wherein contents of said one of said plurality of response buffers are written to the first cache line within the data cache following update of said remaining bytes.

9. The apparatus as recited in 8, further comprising:
    a plurality of byte mask registers, each of said plurality of byte mask registers corresponding to said each of said plurality of response buffers, wherein contents of one of said plurality of byte mask registers denote first byte positions within said one of said plurality of response buffers where said first bytes are stored by said write allocate logic.

10. The apparatus as recited in claim 9, wherein said contents of said one of said plurality of byte mask registers also denote remaining byte positions within said one of said plurality of response buffers where said remaining bytes are to be stored.

11. The apparatus as recited in claim 3, wherein said write buffer comprises:
    a command field, configured to buffer said speculative write command; and
    a command validation field, coupled to said command field, configured to store a validation bit corresponding to said speculative write command, wherein said validation bit indicates whether or not said speculative write command is to be issued to said external bus.

12. The apparatus as recited in claim 11, wherein said write allocate logic comprises:
    a snoop/backoff controller, configured to detect events that interrupt update of said remaining bytes, and configured to modify said validation bit to indicate that said speculative write command is to be issued to said external bus.

13. A cache line allocation apparatus within a pipeline microprocessor, for allocating a selected cache line upon a write miss, the cache line allocation apparatus comprising:
    a data cache, for storing a plurality of cache lines retrieved from external memory, wherein each of said plurality of cache lines comprises 32 bytes; and
    cache control logic, coupled to said data cache, configured to store data corresponding to the write miss within the selected cache line, and to update the selected cache line from said external memory, wherein said data is stored before said selected cache line is updated, and wherein selected bytes within the selected cache line are not updated, said selected bytes being those within which said data are stored, wherein said cache control logic comprises:

a plurality of byte mask registers, each of said plurality of byte mask registers corresponding to each of a plurality of cache ways within said data cache, wherein contents of one of said plurality of byte mask registers denote said selected bytes.

14. The cache line allocation apparatus as recited in claim 13, further comprising:

a plurality of response buffers, coupled to said cache control logic, each of said plurality of response buffers configured to temporarily store one of said plurality of cache lines as it is being received from said external memory.

15. The cache line allocation apparatus as recited in claim 14, wherein said cache control logic selects one of said plurality of response buffers within which to temporarily store said data, and within which the selected cache line is updated from said external memory, wherein contents of said one of said plurality of response buffers are written to a selected one of said plurality of cache lines within said data cache following update of the selected cache line.

16. The cache line allocation apparatus as recited in 15, further comprising:

a plurality of byte mask registers, each of said plurality of byte mask registers coupled to said each of said plurality of response buffers, wherein contents of one of said plurality of byte mask registers denote said selected bytes.

17. The cache line allocation apparatus as recited in claim 13, further comprising:

a write buffer, coupled to said cache control logic, for temporarily storing a speculative write command, said speculative write command directing said external memory to store said data.

18. The cache line allocation apparatus as recited in claim 17, wherein said cache control logic comprises:

a snoop/backoff controller, for detecting events that interrupt update of the selected cache line from said external memory, for causing said speculative write command to be issued to an external memory bus for execution.

19. An apparatus for performing write allocation in a data cache when a write miss occurs, the apparatus comprising:

write allocate logic, configured to update a cache line within the data cache with data bytes corresponding to the write miss and with data from external memory, wherein said data bytes are updated prior to update of said data from said external memory, and wherein byte positions within said cache line corresponding to said data bytes are masked during update of said data, thereby preserving said data bytes within said cache line, said write allocate logic comprising:

snoop/backoff control logic, configured to detect events that interrupt update of said cache line; and a write buffer, coupled to said write allocate logic, for storing a speculative write command, said speculative write command directing that said data bytes be stored within said external memory.

20. The apparatus as recited in 19, wherein said write allocate logic further comprises:

a byte mask register, for indicating said byte positions.

21. The apparatus as recited in claim 19, further comprising:

a response buffer, coupled to said write allocate logic, for receiving contents of said external memory corresponding to said cache line.

22. The apparatus as recited in 21, further comprising:

a byte mask register, coupled to said response buffer, for indicating said byte positions.

23. A method for allocating a cache line within a pipeline microprocessor, the method comprising:

a) storing data bytes corresponding to a write miss to an allocated cache line within the data cache;

b) queuing a speculative write command to external memory corresponding to the write miss;

c) following said storing, updating remaining bytes within the allocated cache line from external memory; and d) if said updating is interrupted, issuing the speculative write command, thereby storing the data bytes to the external memory.

24. The method as recited in claim 23, wherein said storing comprises:

i) writing the data bytes in corresponding byte positions within the allocated cache line; and ii) designating the corresponding byte positions within a byte mask as having been written.

25. The method as recited in claim 24, wherein said updating comprises:

i) loading a complete cache line from external memory that corresponds to the allocated cache line; and ii) copying only those byte positions from the cache line to the allocated cache line which are not designated as having been written by said designating.

26. The method as recited in claim 24, wherein said updating comprises:

i) loading a complete cache line from external memory that corresponds to the allocated cache line;

ii) copying only those byte positions from the cache line to the response buffer which are not designated as having been written by said designating; and iii) following said copying, transferring contents of the response buffer to the allocated cache line.

27. The method as recited in claim 23, wherein said storing comprises:

i) writing the data bytes in corresponding byte positions a response buffer; and ii) designating the corresponding byte positions within a byte mask as having been written.

28. The method as recited in claim 23, wherein said queuing comprises:

i) posting the speculative write command within a speculative write buffer; and ii) designative the speculative write command as being invalid.

29. The method as recited in claim 28, wherein said issuing comprises:

i) monitoring the validity of commands within the speculative write buffer;

ii) transmitting valid commands to an external memory bus to affect memory transfers; and iii) if said updating is interrupted, marking the speculative write command as being valid.

* * * * *